US012567676B2

(12) United States Patent
Pandey et al.

(10) Patent No.: US 12,567,676 B2
(45) Date of Patent: Mar. 3, 2026

(54) DIELECTRIC STRUCTURE USEFUL FOR SHAPING ELECTROMAGNETIC PHASE WAVEFRONTS

(71) Applicant: ROGERS CORPORATION, Chandler, AZ (US)

(72) Inventors: Shailesh Pandey, Woburn, MA (US); Gianni Taraschi, Arlington, MA (US); Kristi Pance, Auburndale, MA (US); Daniel Pennock, Salem, MA (US)

(73) Assignee: ROGERS CORPORATION, Chandler, AZ (US)

( * ) Notice: Subject to any disclaimer, the term of this patent is extended or adjusted under 35 U.S.C. 154(b) by 187 days.

(21) Appl. No.: 18/374,436

(22) Filed: Sep. 28, 2023

(65) Prior Publication Data

US 2024/0113442 A1 Apr. 4, 2024

Related U.S. Application Data

(60) Provisional application No. 63/411,255, filed on Sep. 29, 2022.

(51) Int. Cl.
*H01Q 15/08* (2006.01)

(52) U.S. Cl.
CPC .................................. *H01Q 15/08* (2013.01)

(58) Field of Classification Search
CPC ....... H01Q 15/08; H01Q 17/00; H01Q 17/001
See application file for complete search history.

(56) References Cited

U.S. PATENT DOCUMENTS

| | | | | |
|---|---|---|---|---|
| 3,321,821 | A * | 5/1967 | Horst | H01Q 15/08 264/108 |
| 7,420,522 | B1 * | 9/2008 | Steinbrecher | H01Q 17/008 343/893 |
| 11,616,302 | B2 * | 3/2023 | George | H01Q 19/18 343/837 |
| 11,848,497 | B2 * | 12/2023 | Pance | H01Q 21/061 |
| 2012/0306708 | A1 | 12/2012 | Henderson et al. | |
| 2020/0176876 | A1 | 6/2020 | Pance et al. | |

OTHER PUBLICATIONS

International Search Report with Written Opinion issued in International Application No. PCT/US2023/034102; International Filing Date Sep. 29, 2023; Date of Mailing Mar. 15, 2024 (22 pages).

* cited by examiner

*Primary Examiner* — Tho G Phan
(74) *Attorney, Agent, or Firm* — CANTOR COLBURN LLP

(57) ABSTRACT

A dielectric structure useful for shaping electromagnetic, EM, phase wavefronts, includes: a body having a monolithic construct; the body having a height dimension, H, from a proximal end to a distal end equal to or less than 60% of an overall outside dimension, D, of the body at the distal end, the distal end being disposed a distance away from the proximal end along a z-axis of an orthogonal x-y-z coordinate system, the distal end forming an electromagnetic aperture of the structure; the body having a sidewall between the proximal end and the distal end that forms and defines an interior cavity that is open at the proximal end, and closed at the distal end, the sidewall having a plurality of structural disruptions around an enclosing boundary of the interior cavity, the plurality of structural disruptions disposed and configured to reduce electromagnetic reflections.

30 Claims, 15 Drawing Sheets

DIELECTRIC STRUCTURE USEFUL FOR SHAPING ELECTROMAGNETIC PHASE WAVEFRONTS

CROSS REFERENCE TO RELATED APPLICATIONS

This application claims the benefit of U.S. Provisional Application Ser. No. 63/411,255, filed 29 Sep. 2022, which is incorporated herein by reference in its entirety.

BACKGROUND

The present disclosure relates generally to electromagnetic dielectric structures, particularly to a dielectric structure useful for shaping electromagnetic, EM, phase wavefronts, and more particularly to the dielectric structure forming a lens and not a dielectric resonator antenna.

The ability to control the focus or shape of electromagnetic phase fronts is of importance in many technologies involving electromagnetic radiation devices and systems, such as antennas for example. With such importance, structures that facilitate controlled shaping of the phase fronts absent the use of mechanical moving parts would be welcomed in the art. While existing devices and systems useful for shaping electromagnetic phase fronts may be suitable for their intended purpose, the art of shaping electromagnetic phase fronts would be advanced with an improved structure that overcomes existing shortcomings.

BRIEF SUMMARY

An embodiment includes a dielectric structure useful for shaping EM phase wavefronts as defined by the appended independent claim(s). Further advantageous modifications of the dielectric structure useful for shaping EM phase wavefronts are defined by the appended dependent claims.

In an embodiment, a dielectric structure useful for shaping electromagnetic, EM, phase wavefronts, includes: a body having a monolithic construct; the body having a low profile, in that a height dimension, H, from a proximal end to a distal end is equal to or less than 60% of an overall outside dimension, D, of the body at the distal end, the distal end being disposed a distance away from the proximal end along a z-axis of an orthogonal x-y-z coordinate system, the distal end forming an electromagnetic aperture of the structure; the body having a sidewall between the proximal end and the distal end that forms and defines an interior cavity that is open at the proximal end, and closed at the distal end, the sidewall having a plurality of structural disruptions around an enclosing boundary of the interior cavity, the plurality of structural disruptions disposed and configured to reduce electromagnetic reflections.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

Figure 1A:
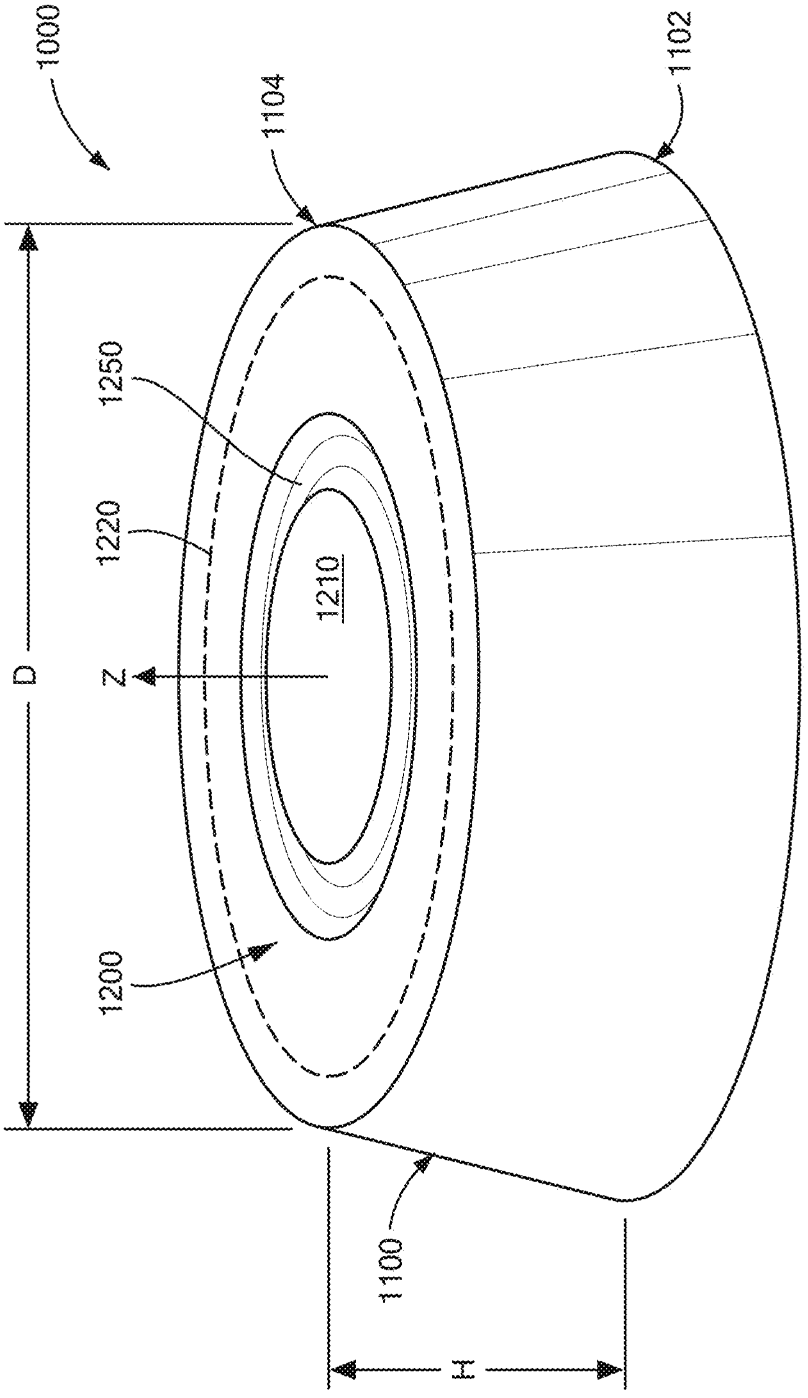
FIGS. 1A, 1B, and 1C, respectively depict; a rotated isometric top-down solid view, a transparent side view, and a central x-y plane cross-section view, of a dielectric structure or lens, in accordance with an embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

Embodiments disclosed herein include dielectric structures that perform the function of controlling the beamwidth and the side lobe level, SLL, of EM radiation using dielectric constant, Dk, values ranging from 2-20. An embodiment of a dielectric structure as disclosed herein may share features and functions common with an EM lens, and therefore may herein be referred to as a lens (i.e., an EM lens). An example EM signal source used herein to electromagnetically excite, illuminate, the dielectric structure may be any kind of source that generates a spherical phase front. A dielectric structure disclosed herein may be scaled to frequencies other than those specifically disclosed herein based on a desired application.

In an embodiment as disclosed herein, loading the dielectric structure with a relatively high Dk material enables lowering of the profile of the dielectric structure, which is contemplated to be advantageous for many applications.

At least some of the embodiments disclosed herein were designed and simulated using commercial off-the-shelf dielectric materials with Dk values and structure having the function of converting a spherical phase electromagnetic wavefront to a planar phase electromagnetic wavefront, which indirectly makes all the electric field lines travel in the same direction, and which increases the gain and radiated directivity of a low directivity antenna based on the size of the aperture of the dielectric structure. Such a construct as disclosed herein has been shown to support and work well for the band of operation from 57 GHz to 64 GHz, alternatively for an operational frequency having a wavelength in the millimeter-wave or microwave electromagnetic spectrum.

While dielectric structures disclosed herein may be constructed from a single dielectric material with a Dk value ranging from 2 to 20, with different effective dielectric constants in different regions based on the volumetric density of dielectric material in those different regions, a multi-dielectric approach may also be employed for increasing the gain of the antenna. In a multi-dielectric approach, the bottom part of the structure, which has the form of a tapered truncated cone, may be designed using a low Dk material, ranging from 1 to 3 for example, which is contemplated to improve the SLL of the entire design based on the desired specifications.

In a single Dk material construct, the structure may include partial openings (shapes) as viewed from the bottom to achieve the desired effective Dk value, which is useful in improving the performances, such as gain and SLL. Such openings or shapes can have the form of a cylinder, square, Jerusalem cross etc. which are capable of being molded and are capable of being created with 3D printing.

Some embodiments disclosed herein include curved features on the side wall and edges, which serve to reduce the EM reflections and improve the performances.

As disclosed here, some embodiments may be attached on a printed circuit board, PCB, or customer supplied board using fasteners or adhesives, based on the particular assembly requirements of the PCB or customer board. In an embodiment, the PCB or customer board may be a radio frequency, RF, board having a source surrounded with lumped elements and with EM transmission lines that send control signals through standard chipsets.

Some embodiments disclosed herein demonstrate that a low-cost, single material, low-profile, dielectric structure is capable of shaping the phase fronts of the electric fields radiated out of a composite design having an EM signal source and structure. In an embodiment disclosed herein, the dielectric structure takes the spherical wavefront emitted from the source and shapes it using dielectric material having a Dk range from 2-20, which may be off the shelf available with or without fillers. An embodiment using different Dk value's may be scaled to other frequencies based on the required applications like beamwidth control i.e., narrow and broad, SLL control, polarization, etc. A higher Dk material would support a reduction in the profile of the structure without affecting the required performances. In an embodiment disclosed herein, the Dk structures support operating frequencies ranging from 57 GHz to 64 GHz.

Figure 1B:
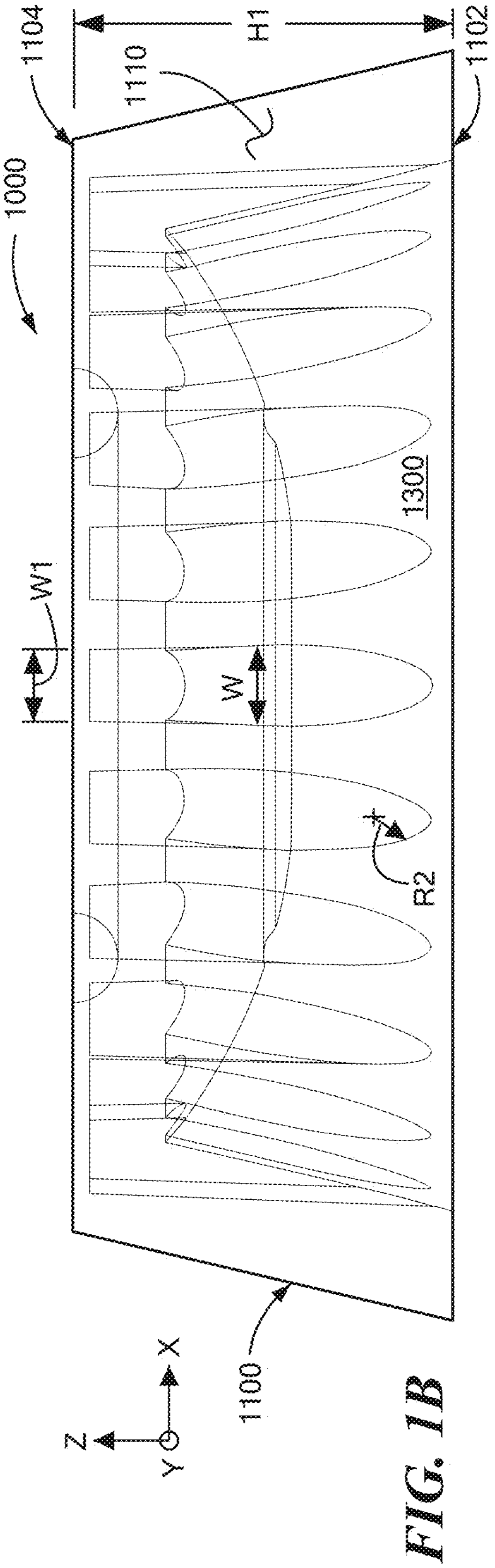
Figure 1C:
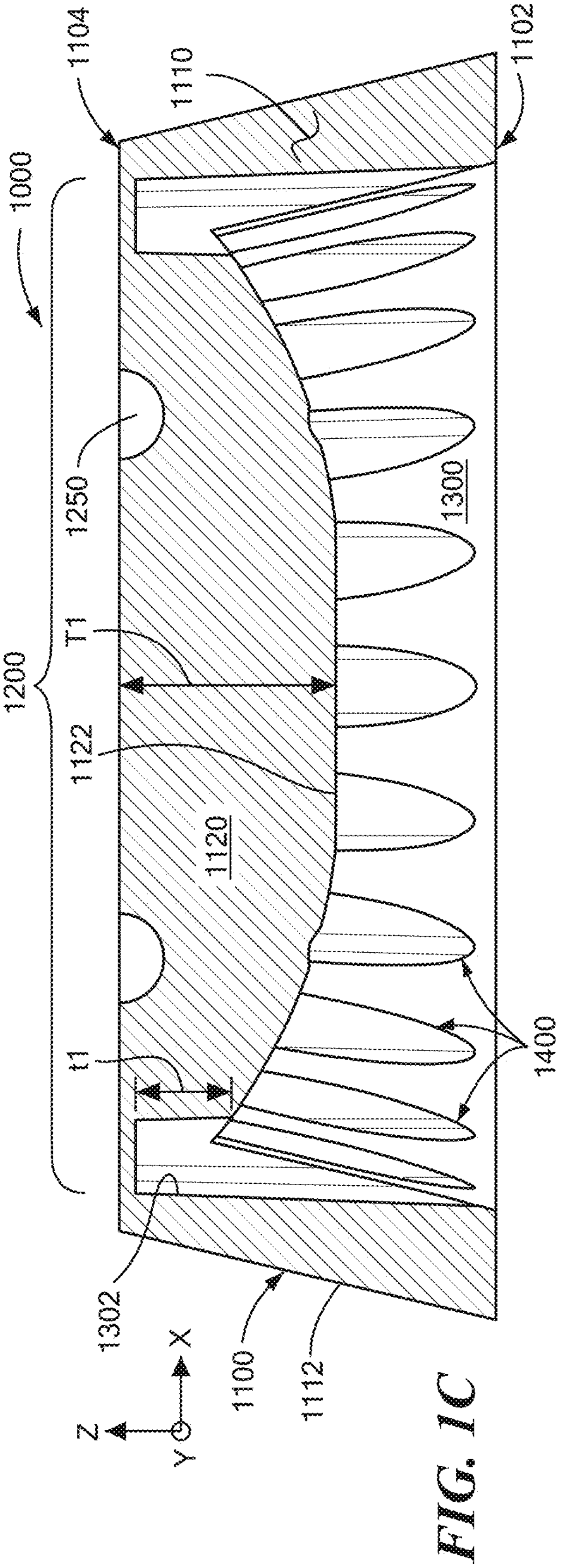

Reference is now made to FIGS. 1A, 1B, and 1C, collectively, which respectively depict; a rotated isometric solid view, a transparent side view, and a central x-y plane cross-section view, of a dielectric structure (or lens) 1000 having a body 1100 formed of a monolithic construct. In an embodiment, the body 1100 is composed of a single all-dielectric material. In an embodiment, the all-dielectric material of the body 1100 has a Dk value in the range of 2 to 20, and has a structure 1000 that is useful for shaping EM phase wavefronts. In an embodiment, the Dk value of the all-dielectric material of the body 1100 is 7.64 with a loss tangent tan δ equal to 0.0024. In an embodiment, the body 1100 has a low profile, in that a height dimension, H, from a proximal end 1102 to a distal end 1104 of the body 1100 is equal to or less than 60% of an overall outside dimension, D, of the body 1100 at the distal end 1104, the distal end 1104 being disposed a distance away from the proximal end 1102 along a z-axis of an orthogonal x-y-z coordinate system, the distal end 1104 forming an electromagnetic aperture 1200 of the structure 1000, the proximal end 1102 configured to electromagnetically couple with a low directivity radiating element (discussed further herein below). As depicted, the body 1100 has a sidewall 1110 (best seen in FIG. 1B) between the proximal end 1102 and the distal end 1104 that forms and defines an interior cavity 1300 that is open at the proximal end 1102, and closed at the distal end 1104, the sidewall 1110 having a plurality of structural disruptions, or sidewall features, 1400 (best seen in FIG. 1C) around an enclosing boundary 1302 of the interior cavity 1300, the plurality of structural disruptions 1400 disposed and configured to reduce electromagnetic reflections, reduce side lobe levels of electromagnetic radiation, and improve efficiency of the aperture 1200. In an embodiment, the plurality of structural disruptions 1400 have the form of partial cylindrical indentations or voids set into the interior of the sidewall 1110 aligned in a substantially vertical direction parallel with the z-axis. In an embodiment, the plurality of structural disruptions 1400 in the sidewall 1110 are uniformly distributed around the enclosing boundary 1302 of the interior cavity 1300.

In an embodiment, the aperture 1200 has a varying thickness that varies radially from a central z-axis of the aperture 1200 to an outer perimeter 1220 of the aperture 1200.

In an embodiment, the varying thickness of the aperture 1200 is symmetrical about the central z-axis, such that a 3D construct of the aperture 1200 is definable by rotating a 2D axial cross-sectional profile about the central z-axis.

In an embodiment, the all-dielectric material of the body 1100 has a dielectric constant equal to or greater than 2 and equal to or less than 20, alternatively equal to or greater than 4 and equal to or less than 20, further alternatively equal to or greater than 6 and equal to or less than 20, yet further alternatively equal to or greater than 10 and equal to or less than 20. In an embodiment, the all-dielectric material includes a plastic, and a filler material having a dielectric constant greater than the dielectric constant of the plastic. In an embodiment, the plastic includes a thermoplastic, or a thermoset plastic. In an embodiment, the filler material includes a ceramic.

In an embodiment, the body 1100 has interior 1302 and exterior 1112 surfaces that are structured to be moldable via a single-axis molding machine having positive and negative mold forms that are movable relative to each other along the z-axis. In an embodiment, interior 1302 and exterior 1112 surfaces are structured with a draft angle that tapers radially outward, along the z-axis, from the distal end 1104 to the proximal end 1102.

In an embodiment and as depicted in FIG. 1C, the central x-z cross-section of the body 1100, at the aperture 1200, forms a dielectric cap 1120 of the dielectric material of the body 1100 at the distal end 1104 of the body 1100, the cap 1120 having a curved profile 1122 that is thicker in the center of the body 1100 with thickness T1 than at the perimeter of the body 1100 with thickness t1. As depicted, the curved profile 1122 extends into, or is within, the interior cavity 1300 of the body 1100. In an embodiment, the cap 1120 and curved profile 1122 have axial symmetry about the z-axis such that the body 1100 also has an y-z cross section that forms the cap 1120 at the distal end 1104 of the body 100 with the curved profile 1122 that is thicker in the center of the body 1100 with thickness T1 than at the perimeter of the body 1100 with thickness t1. By virtue of the cap 1120 having a thickness that varies from T1 at the center of the body 1100 to t1 at the perimeter of the body 1100, the aperture 1200 has an effective dielectric, Dk, constant value that is greater at the center of the aperture than at the perimeter of the aperture. As applied herein, the effective Dk constant is defined, at a given location within the aperture 1200, as the average dielectric constant over a cubic volume of the aperture 1200, or between thickness t1 to T1 of the cap 1120, having a volume of $\lambda_o^3$, where $\lambda_o$ is the free space wavelength of electromagnetic radiation at a defined operating frequency of the structure 1000. In an embodiment, the sidewall 1110 has an effective dielectric, Dk, constant value that is less than an effective Dk constant at the center (see T1) of the aperture 1200. In an embodiment, the sidewall 1110 is disposed radially outboard of the perimeter 1202 of the aperture 1200, and the sidewall 1110 has an effective dielectric, Dk, constant value that is greater than an effective Dk constant at the perimeter 1202 of the aperture 1200.

Figure 2A:
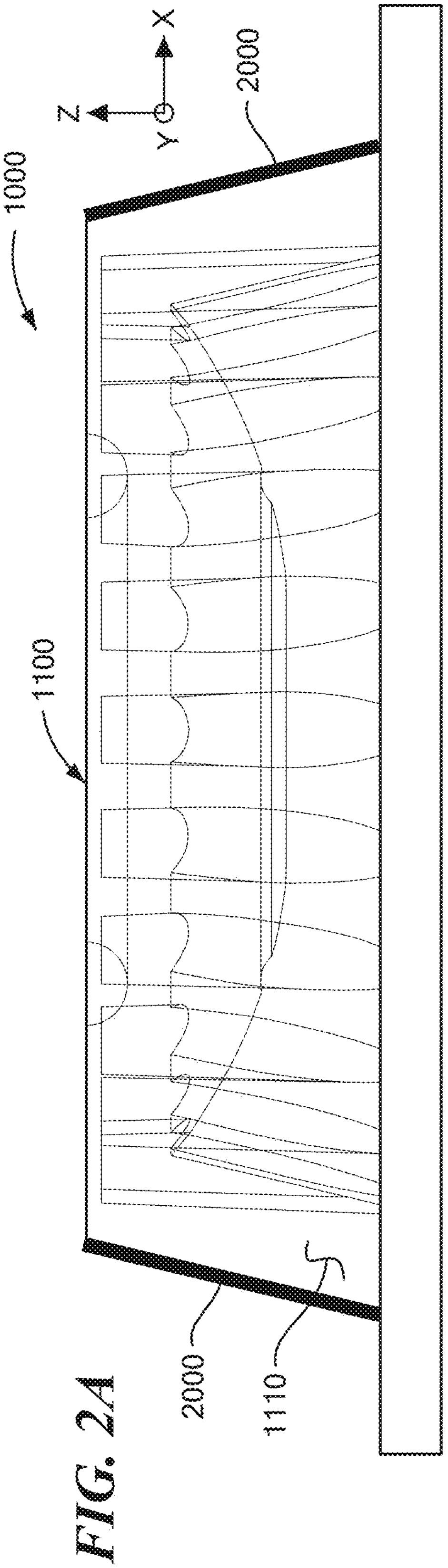
FIGS. 2A and 2B each depict a transparent side view of a dielectric structure similar to that of FIGS. 1A-1C, but with an electromagnetic absorber, in accordance with an embodiment.
Figure 2B:
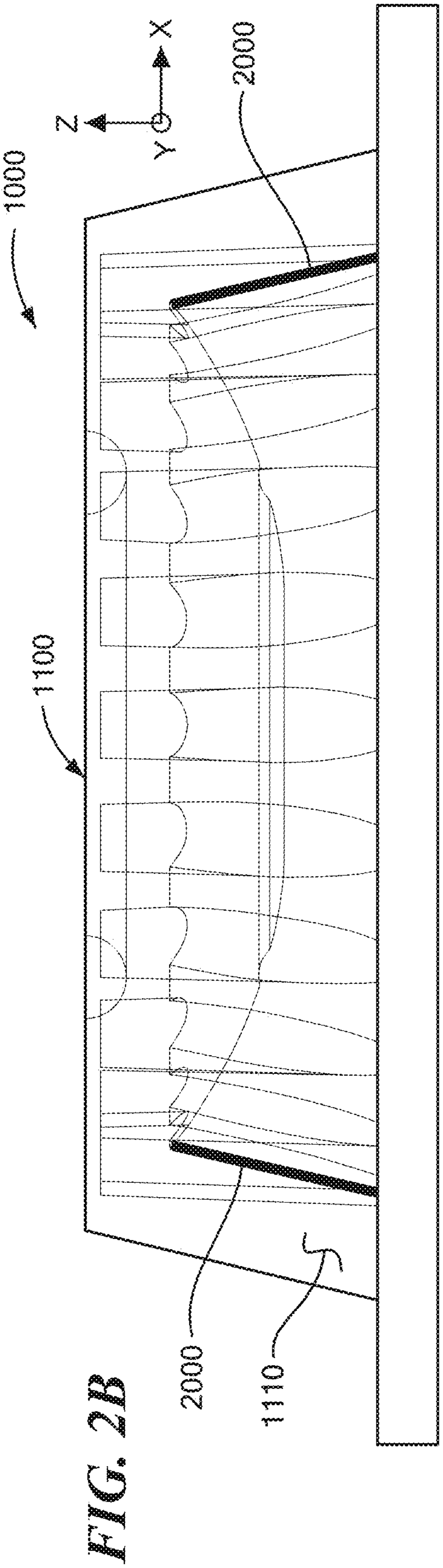

With reference now to FIGS. 2A and 2B in combination with FIGS. 1A-1C, an embodiment of the body 1100 further includes at least one EM absorber 2000 configured and disposed to absorb EM radiation that serves to reduce EM reflections from within the body 1100 and reduce SLL radiating from the body 1100, without degrading other performance characteristics like gain and isolation at the operating frequency of interest. In an embodiment, the EM absorber 2000 is disposed on at least one of an exterior surface 1112 or an interior surface 1302 of the sidewall 1110 of the body 1100. The EM absorber 2000 may be attached (e.g., adhered, bonded, adhesively bonded, thermally bonded), or press fit mechanically bonded (e.g., no adhesive), or it may be created in the same process as the body 1100 is created (e.g., 2-shot injection molding, or 3D printing). In an embodiment, the EM absorber 2000 conforms to the shape of the body 1100, (e.g., smooth or with features) either to the interior surface 1302 or to the exterior surface 1112 of the sidewall 1110, or to both surfaces 1302, 1112. In an embodiment, the EM absorber 2000 consists of a single layer of EM material. In an embodiment, the EM absorber 2000 is made from a high loss material at the frequency range of interest, such as plastic filled with lossy material (e.g., metallic particles, magnetic particles, ceramic particles), or foam filled with lossy materials. In an embodiment, the EM absorber 2000 completely encircles the central z-axis of the body 1100 proximate the sidewall 1110. In an embodiment, the EM material includes a plastic or a foam, which may include metallic particles, magnetic particles, or ceramic particles, which serve to provide a lossy EM material at a defined operating frequency of the structure 1000. In an embodiment, both of the exterior surface 1112 and the interior surface 1302 has the EM absorber 2000 attached thereto.

Figure 3A:
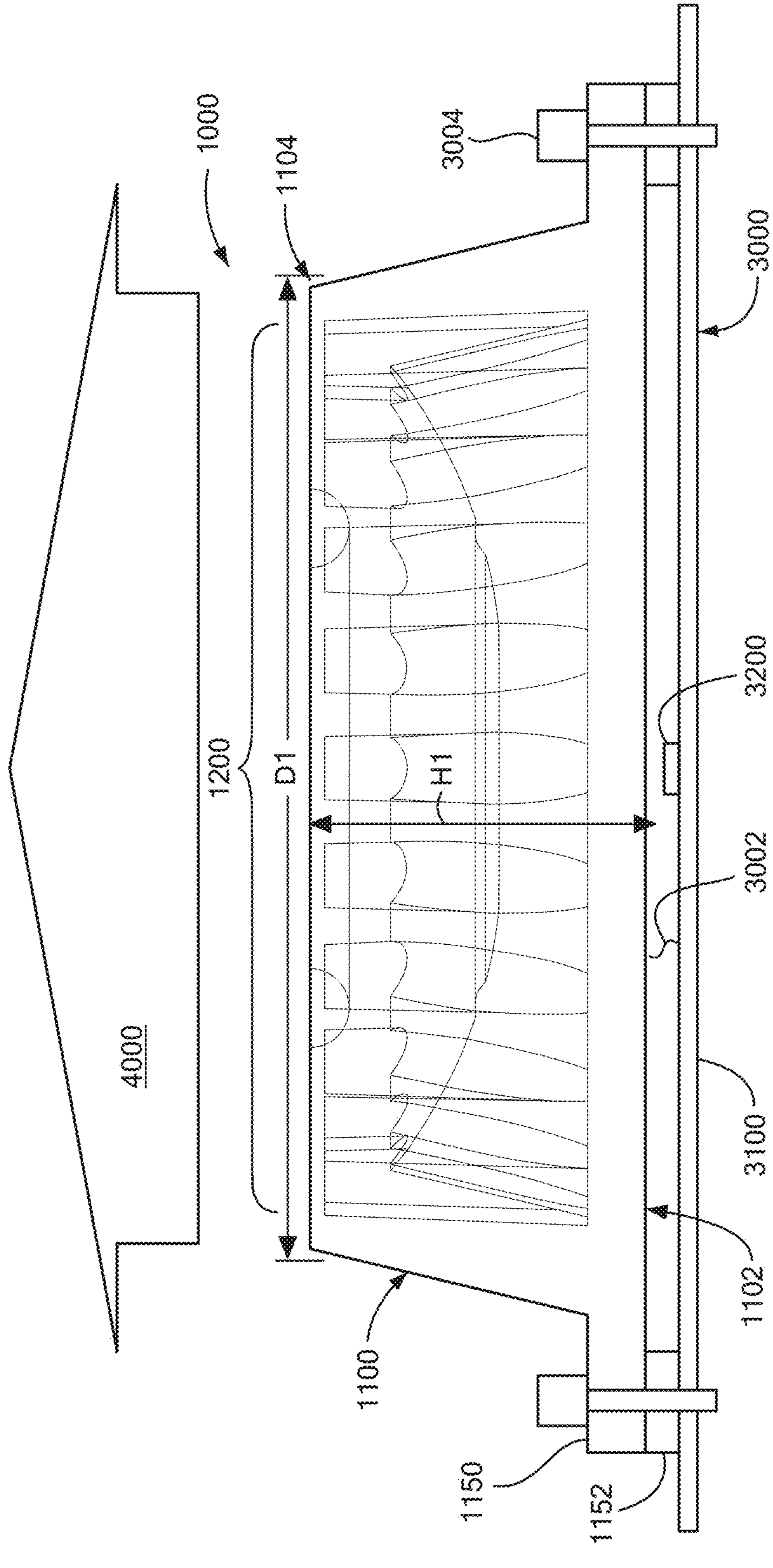
FIG. 3A depicts a transparent side view of a dielectric structure similar to that of FIGS. 1A-1C, assembled to a substrate, in accordance with an embodiment.
Figure 3B:
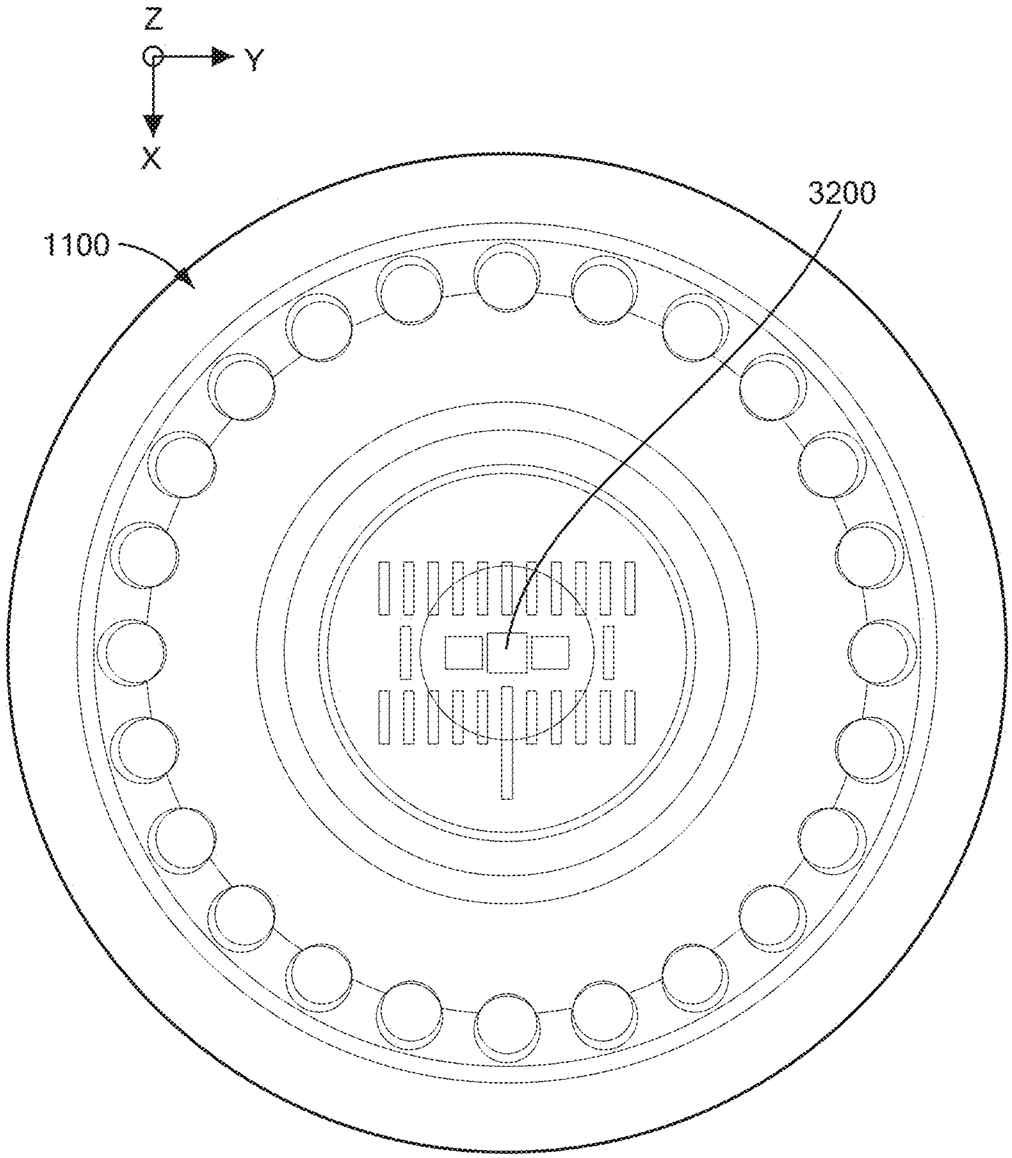
FIG. 3B depicts a transparent top down view of the dielectric structure of FIG. 3A, in accordance with an embodiment.

With reference to FIGS. 3A-3B in combination with FIGS. 2A-2B, an embodiment includes an arrangement wherein the body 1100 further includes a monolithically formed support feature 1150 that extends radially outboard of the aperture 1200 at the proximal end 1102 of the body 1100, the support feature 1150 being configured to permit attachment of the structure 1000 to a substrate 3000. In an embodiment, the substrate 3000 includes, or may be, a printed circuit board, PCB, 3100 which in an embodiment includes a source of EM radiation 3200 disposed and configured to direct EM radiation toward the aperture 1200. In an embodiment, the source of EM radiation 3200 may be a low directivity EM radiation source, which may include any one of a patch, a slotted aperture, a waveguide, a substrate integrated waveguide, a dipole antenna, or an EM horn, for example. In an embodiment, the support feature 1150 is configured and disposed to position the body 1100 off of the substrate 3000 to form a gap 3002 between the substrate 3000 and the proximal end 1102 of the body 1100. However, it will be appreciated that the gap 3002 may not be a necessary feature of an operational embodiment disclosed herein, but rather is an optional feature that may provide functional advantages by providing room for other components to be top-surface mounted on the PCB 3100. In an embodiment, the support feature 1150 includes a monolithically formed standoff 1152 on the bottom of the support feature 1150 that serves to form the gap 3002. In an embodiment, the standoff 1152 may be in the form of a continuous ring around an outer perimeter of the bottom of the support feature 1150, or may be composed of a plurality of individual standoff feet disposed intermittently around the outer perimeter of the bottom of the support feature 1150. In an embodiment, the body 1100 is attached to the substrate 3000 by mechanical fasteners 3004 that pass through the standoff 1152. It will be appreciated, however, that the body 1100 may be attached to the substrate 3000 by any means suitable for a purpose disclosed herein, such as by an adhesive for example. As depicted in FIG. 3A, a low directivity EM radiation source 3200 that is electromagnetically coupled to a dielectric structure or lens 1000 as disclosed herein, results in a high directivity EM radiation 4000 that is emitted from the aperture 1200 of the lens 1000. In an embodiment, the lens 1000 is made of a dielectric material having a Dk value of 7.64 with a loss tangent tan δ equal to 0.0024, has an overall height H1 of 10.5 mm, and an overall diameter D1 at the distal end 1104 of 31 mm, and is operational in a frequency range from 57 GHz to 60 GHz. It will be appreciated, however, that specific dimensions and parameters as presented herein are example values only, which may be modified for a particular purpose, such as operating frequency range, and with structure consistent with a structure disclosed herein.

Figure 4:
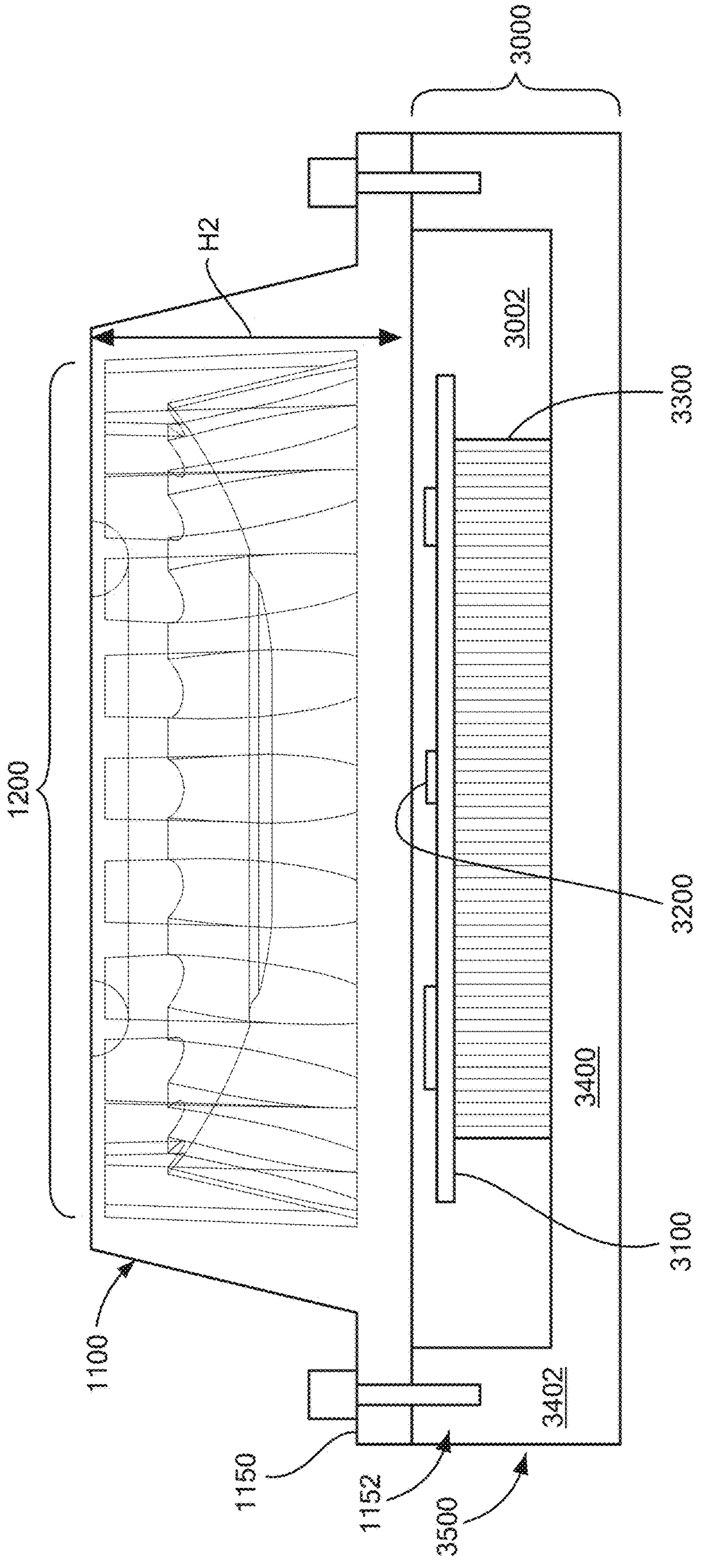
FIG. 4 depicts a transparent side view of the dielectric structure of FIG. 3A, assembled to an alternative substrate, in accordance with an embodiment.

With reference now to FIG. 4 in combination with the other figures disclosed herein, an embodiment of the substrate 3000 includes the PCB 3100 with the source of EM radiation 3200 provided therein, and also includes a heatsink 3300 on which the PCB 3100 is disposed on and thermally coupled to, and a housing 3400 of a system 3500, wherein the heatsink 3300 is disposed on and optionally thermally coupled to the housing 3400. In an embodiment, the housing 3400 includes support and attachment features 3402 that are configured and disposed to support and attach to the support feature 1150 of the body 1100. In an embodiment, the system 3500 includes the housing 3400, optionally the heatsink 3300, the PCB 3100 having the source of EM radiation 3200 configured to direct EM radiation toward the aperture 1200. In an embodiment, the heatsink 3300 is disposed in thermal conductivity with and between the PCB 3100 and the housing 3400, where the heatsink 3300 and the PCB 3100 are disposed within the gap 3002 between the substrate 3000 and the body 1100. As depicted in FIG. 4, the body 1100, the substrate 3000, or both the body 1100 and the substrate 3000, includes a standoff 1152 configured and disposed to form the gap 3002 between the substrate 3000 and the body 1100.

In FIGS. 1A-4, the example lens 1000 depicted and described has a relatively low-profile construct with an example height H1=10.5 mm formed from a relatively high Dk material, Dk=7.64 with tan δ=0.0024, suitable for operating frequencies in the range from 57 GHz to 64 GHz.

In comparison, and with reference now to FIGS. 5A-5E, another example lens 1000' is depicted having a relatively high-profile construct with an example height H2=15 mm formed from a relative low Dk material, Dk=4.05 with tan δ=0.02, that is also suitable for operating frequencies in the range from 57 GHz to 64 GHz. As will be appreciated from this comparison, a lens 1000, 1000' as disclosed herein may have a relatively low profile where relatively high Dk material is employed, or may have a relatively high profile where relatively low Dk material is employed, while being capable of operating at the same desired frequency range. Features of lens 1000' that are like features with respect to lens 1000 have a prime symbol following the respective reference number applied for lens 1000.

Figure 5A:
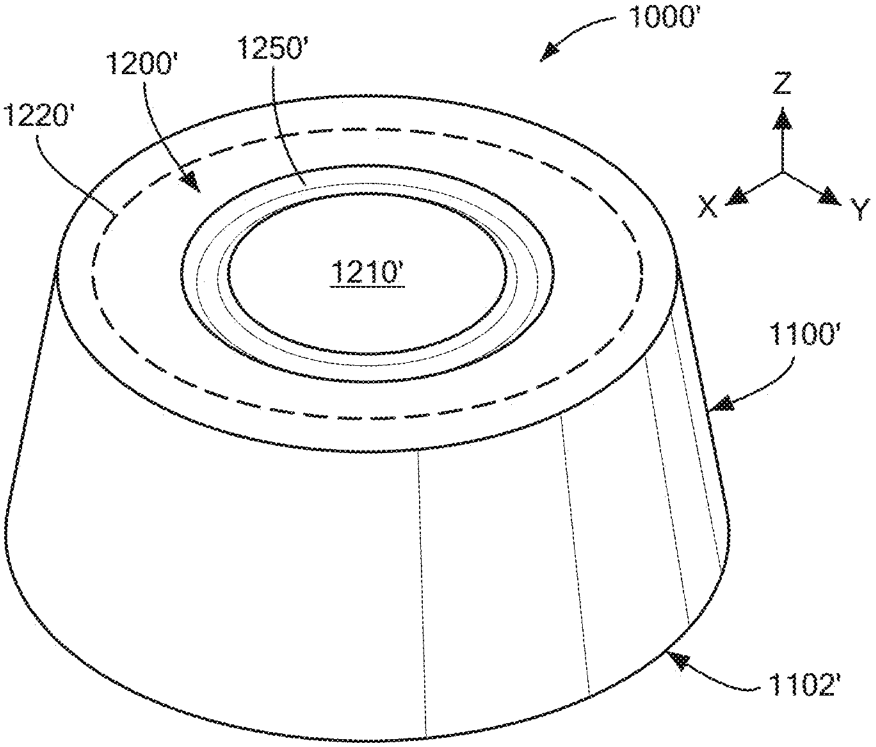
FIGS. 5A, 5B, 5C, and 5D, respectively depict; a rotated isometric top-down solid view, a solid side view, a solid bottom view, and a rotated isometric bottom-up view, of another dielectric structure alternative to that of FIGS. 1A-1C, in accordance with an embodiment.
Figure 5B:
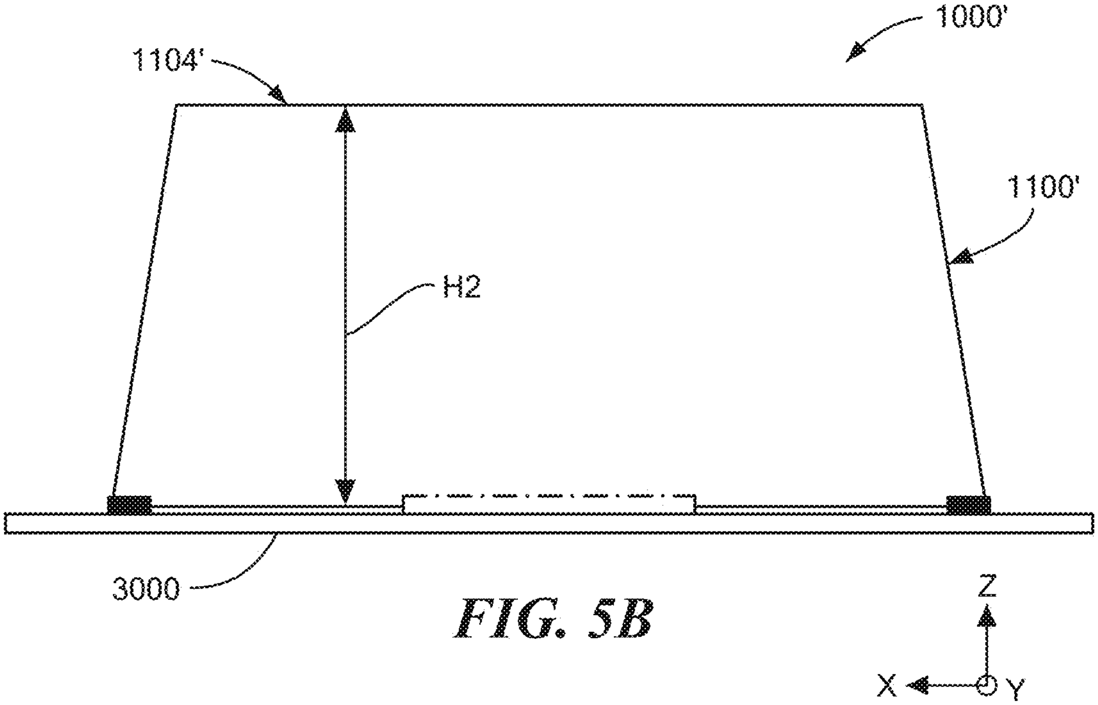
Figure 5C:
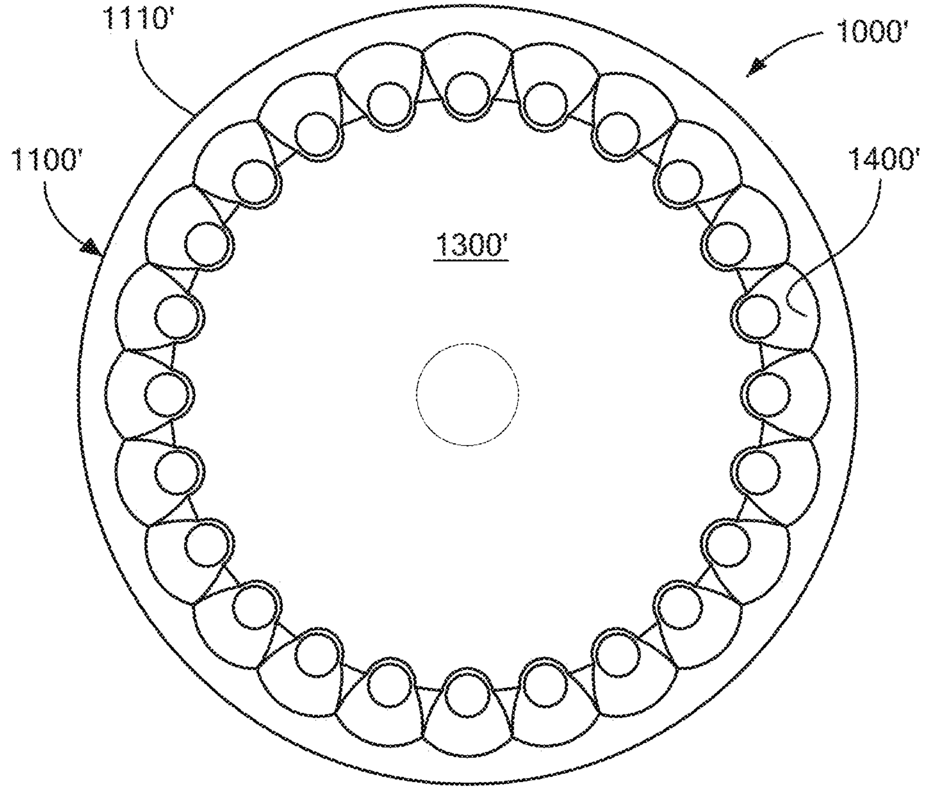
Figure 5D:
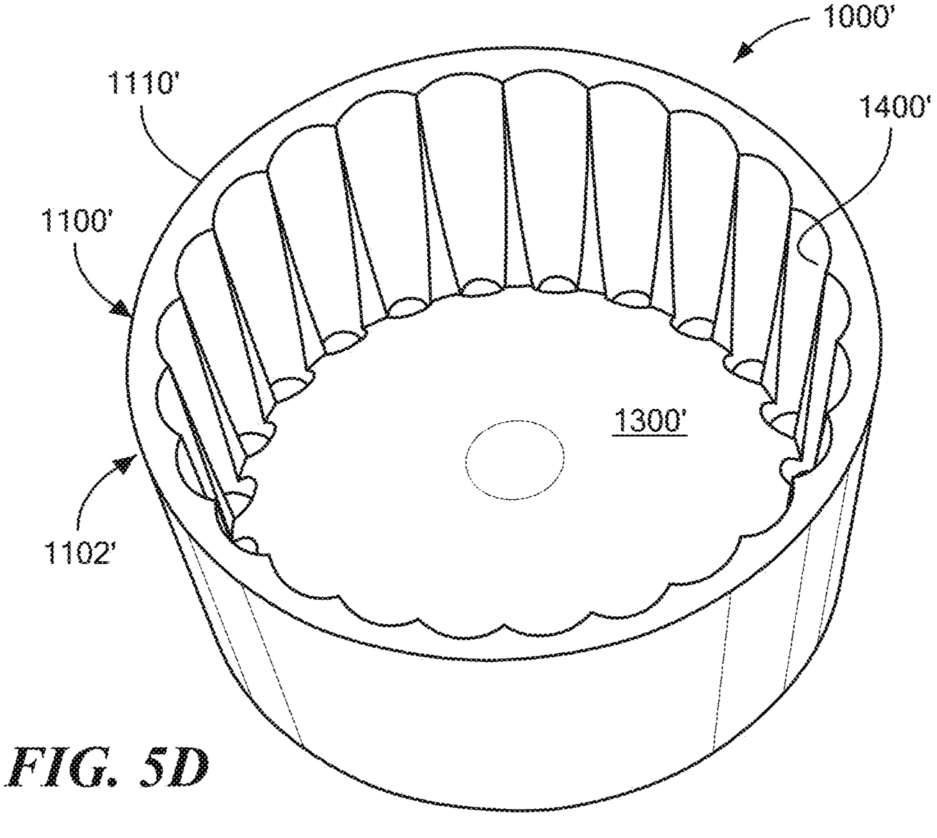

With particular reference to FIGS. 5C and 5D, and as compared to FIGS. 1A-1C, other structural details of the sidewall 1110' as viewed from the interior of the cavity 1300' may be employed to achieve a desired high directivity EM radiation 4000 (depicted in FIG. 3A) output from the aperture 1200'. For example: the plurality of structural disruptions 1400 as depicted in FIG. 1C do not extend all the way to the proximal end 1102 of the body 1100, while the plurality of structural disruptions 1400' as depicted in FIGS. 5C and 5D, do; and, the sidewall 1110 at the proximal end 1102 of the body 1100 is thicker in the embodiment of FIGS. 1B-1C, than is the sidewall 1110' at the proximal end 1102' of the body 1100' in the embodiment of FIGS. 5C-5D.

Figure 5E:
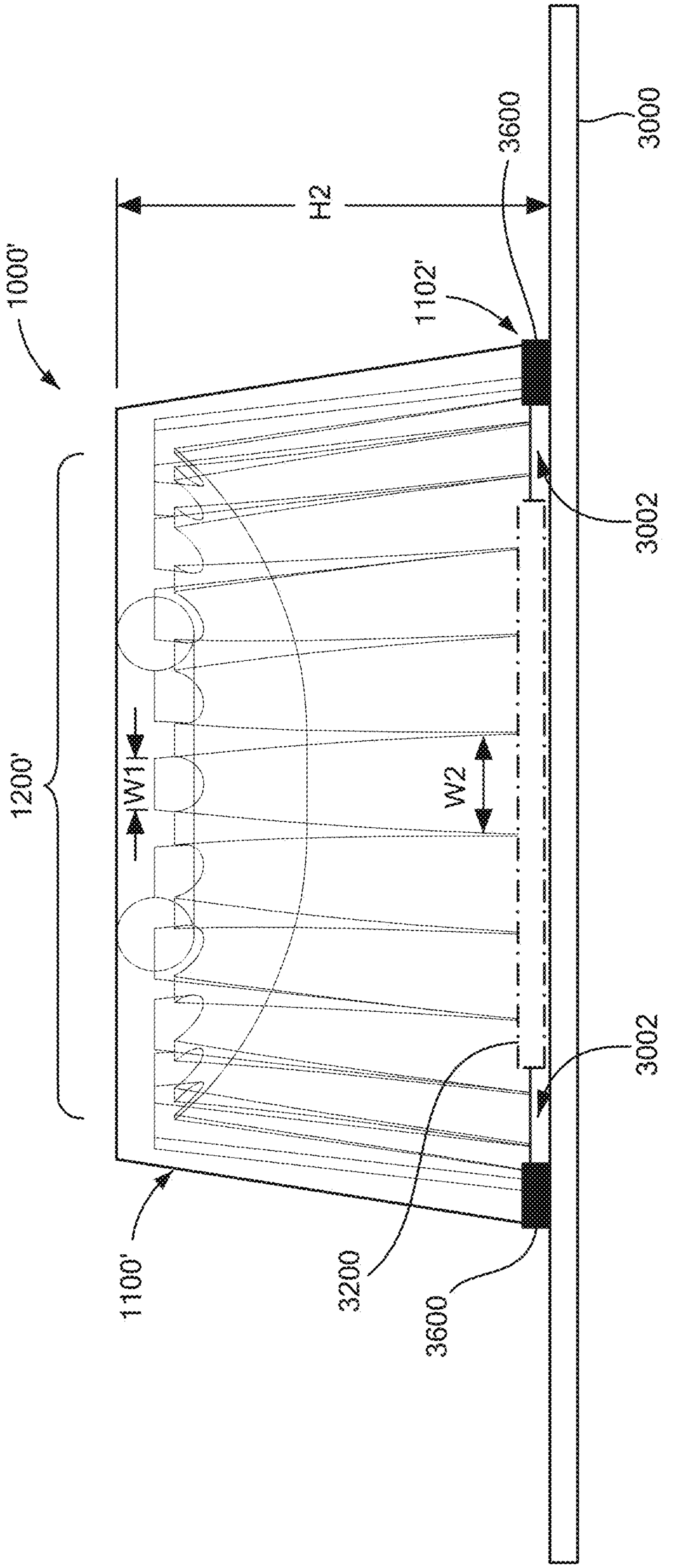
FIG. 5E depicts a transparent side view of the dielectric structure of FIGS. 5A-5D, assembled to a substrate, in accordance with an embodiment.

FIG. 5E depicts the lens 1000' as depicted in FIGS. 5A-5D, disposed on a substrate 3000 having a low directivity source of EM radiation 3200 configured to direct EM radiation toward the aperture 1200'. Here, the body 1100' is bonded to the substrate 3000 using an adhesive 3600, which may be arranged to provide a gap 3002 between the substrate 3000 and the proximal end 1102' of the body 1100' via the adhesive 3600 acting as a standoff. Alternative to the adhesive 3600, a standoff 1152 as described herein above and best seen with reference to FIGS. 3A and 4 may be implemented. Alternatively, the gap 3002 may be absent in the assembly.

Further comparison between the example lens 1000 of FIGS. 1A-1C and the example lens 1000' of FIGS. 5A-5E shows the following.

With respect to lens 1000: the plurality of structural disruptions 1400 in the sidewall 1110 are separated from one another in that adjacent ones of the plurality of structural disruptions 1400 do not overlap or intersect each other; each one of the plurality of structural disruptions 1400 in the sidewall 1110 is an indentation in the sidewall 1110, and has a width W that curvingly transitions from a width W1 at the distal end 1104 of the body 1100 to a tangent of a radius R2 at the proximal end 1102 of the body 1100; the all-dielectric material has a dielectric constant equal to or greater than 6 and equal to or less than 9; and, H1 is equal to or less than 40% of D.

With respect to lens 1000': the plurality of structural disruptions 1400' in the sidewall 1110' blend with one another in that adjacent ones of the plurality of structural disruptions 1400' overlap or intersect each other, at least at the proximal end 1102' of the body 1100' if not at both the proximal end 1102' and the distal end 1104'; each one of the plurality of structural disruptions 1400' in the sidewall 1110' is an indentation in the sidewall 1110', and has a first width W1 at the distal end 1104' of the body 1100', and a second width W2 at the proximal end 1102' of the body 1100', and W2 is greater than W1; the all-dielectric material has a dielectric constant equal to or greater than 2 and equal to or less than 5; and, H2 is equal to or less than 50% of D.

As will be appreciated from the foregoing description of low and high profile lenses 1000 and 1000', system features (e.g., substrate, standoffs, gap, etc.) applicable to one may be applicable to the other.

With reference to FIGS. 1A-1C in combination with FIGS. 5A-5E, an embodiment of the lens 1000, 1000' includes an arrangement where the outer upper surface 1210, 1210' of the aperture 1200, 1200' includes one or more of a structural disruption 1250, 1250' formed around a central z-axis of the body 1100, 1100', which serves to improve gain and reduce SLL. In an embodiment, the structural disruption 1250, 1250' is an indented ring formed in the outer upper surface of the aperture 1200, 1200'. In an embodiment, the aperture 1200, 1200' has a circular outer perimeter 1220, 1220' as observed in a top-down plan view of the structure (lens) 1000, 1000'. While a particular construct of the structural disruption 1250, 1250' is disclosed herein (i.e., an indented ring), it is contemplated that other alternative constructs, such as a plurality of blind pockets arranged in a ring, one or more protrusions arranged in a ring, or any other construct that may be effective in creating a change in Dk value toward an outer edge of the aperture 1200, 1200', may be employed.

Figure 6A:
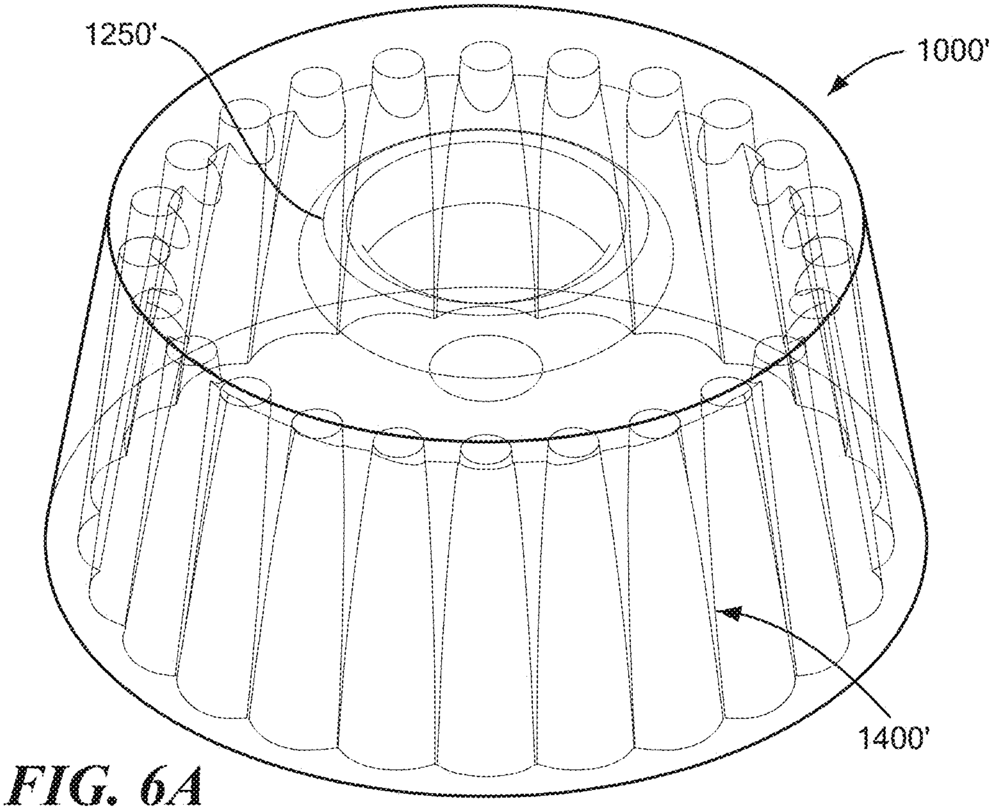
FIGS. 6A and 6B respectively depict; a first rotated isometric top-down transparent view, and a second rotated isometric top-down transparent view, of the dielectric structure of FIGS. 5A-5E, in accordance with an embodiment.
Figure 6B:
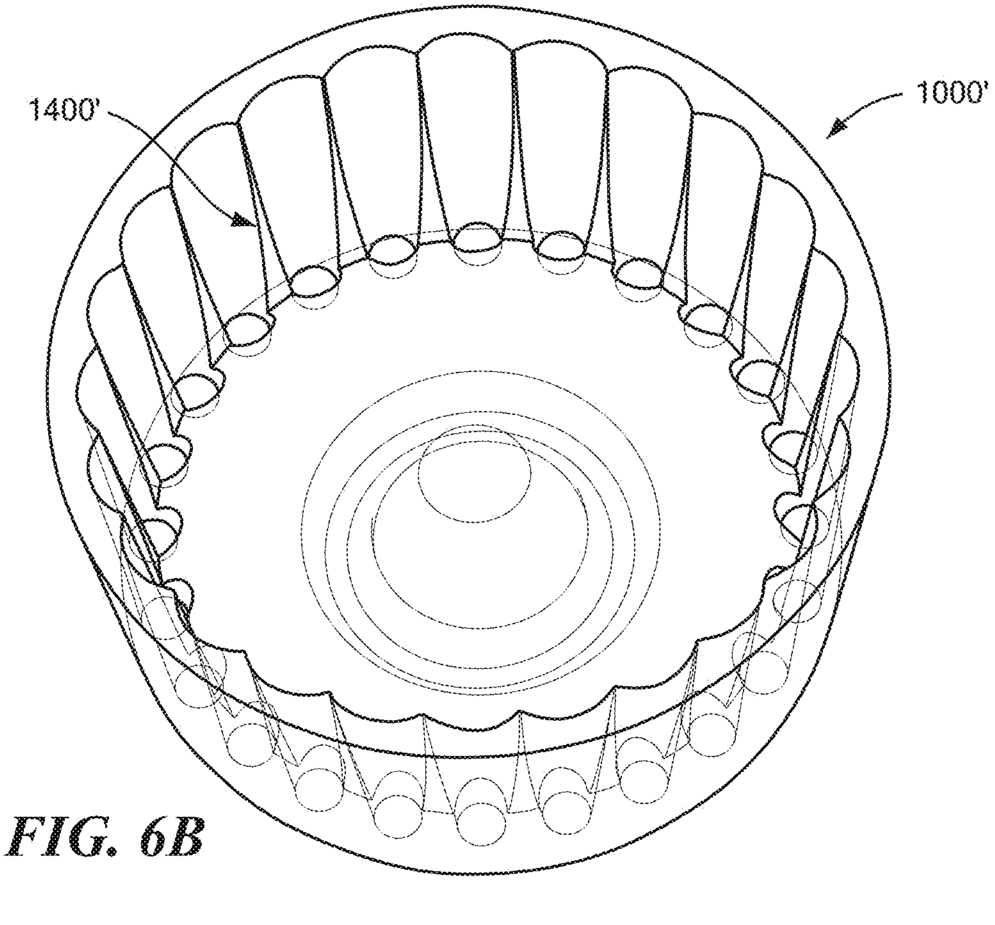

FIGS. 6A and 6B respectively depict a rotated top-down isometric transparent view, and a rotated bottom-up isometric transparent view, of lens 1000' depicted in FIGS. 5A-5E.

Figure 7A:
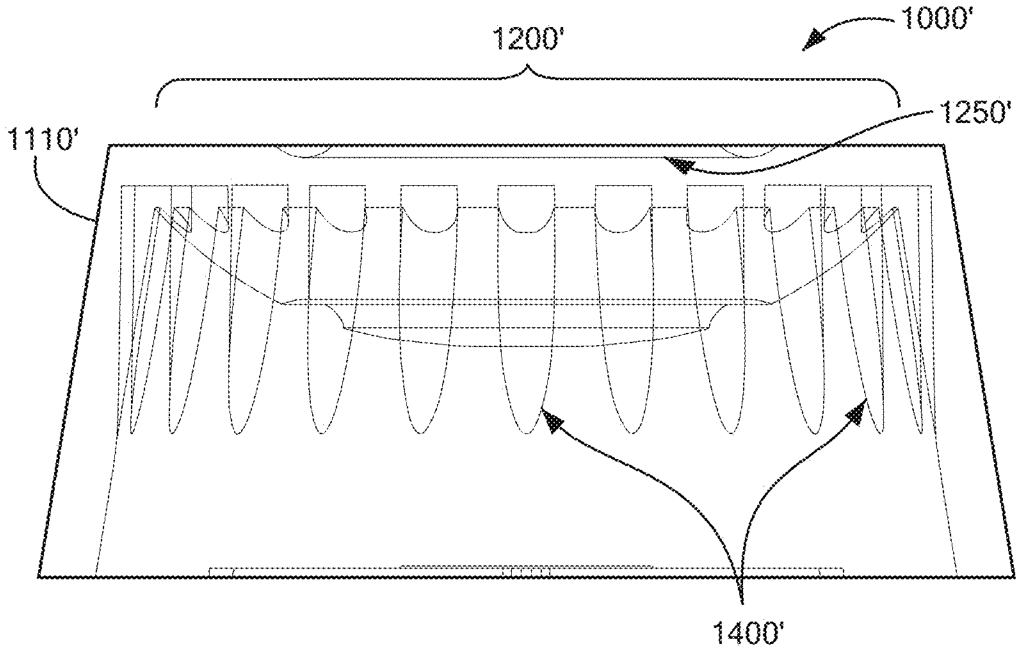
FIGS. 7A and 7B respectively depict; a first transparent side view depicting internal sidewall features and aperture features; and a second transparent side view depicting an absence of the internal sidewall features and the aperture features of FIG. 7A for comparative analytical purposes, in accordance with an embodiment.
Figure 7B:
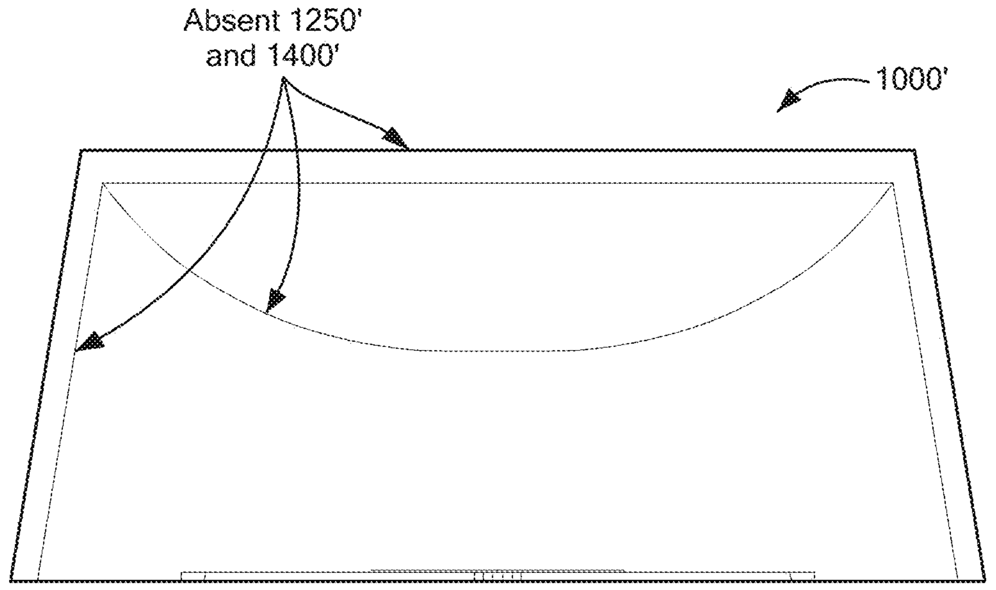

FIGS. 7A and 7B respectively depict: a first transparent side view of the lens 1000' depicting internal sidewall features, the plurality of structural disruptions 1400', and aperture feature, the indented ring structural disruption 1250'; and, a second transparent side view depicting an absence of the internal sidewall features and aperture feature of FIG. 7A, for comparative analytical purposes.

Figure 8:
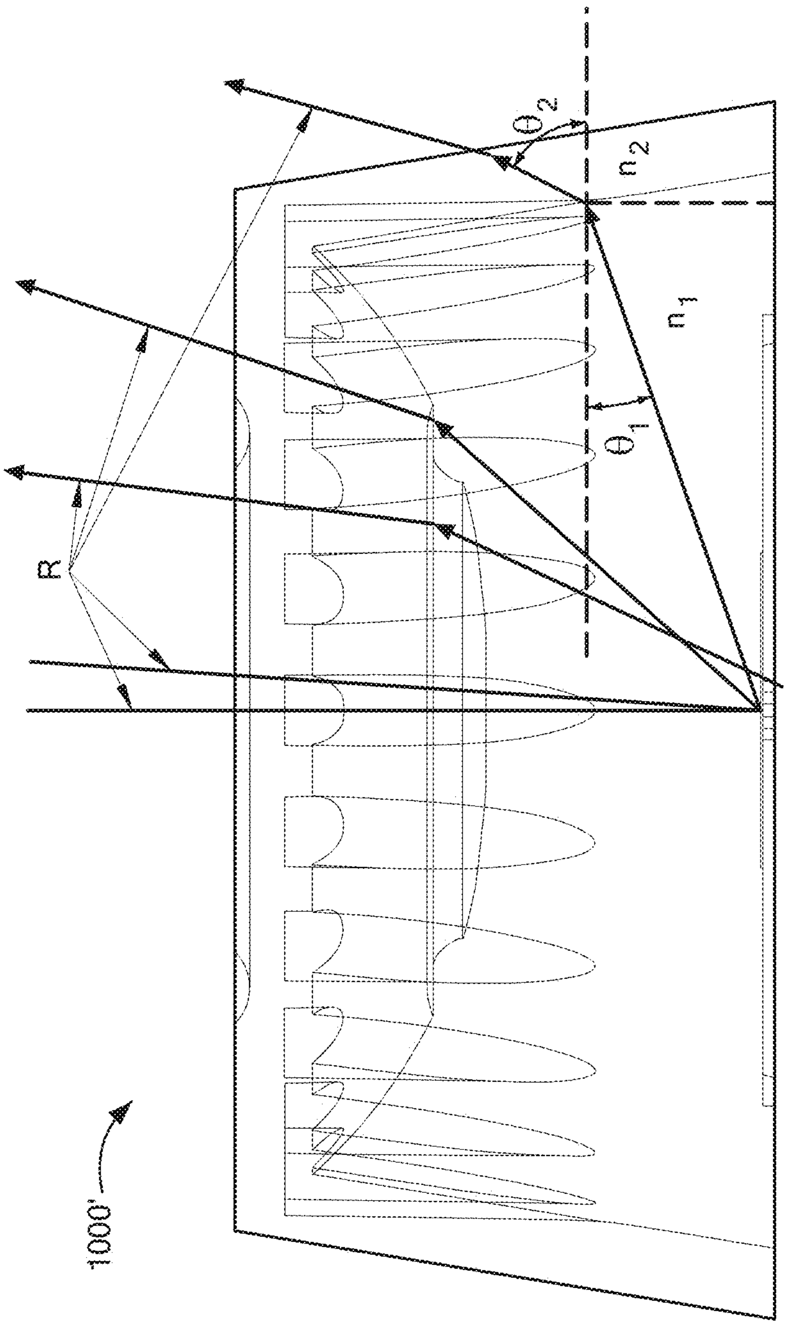
FIG. 8 depicts a transparent side view of the dielectric structure of FIG. 7A with further depiction of total internal reflection ray tracing, in accordance with an embodiment.

FIG. 8 depicts a transparent side view of the dielectric structure, lens 1000', of FIG. 7A with further depiction of total internal reflection ray tracing R (several example rays depicted). Based on a desired output angle for reduced SLL, the refractive index can be determined, where n2=n1*sin (θ1)/sin(θ2), n1 being the effective dielectric constant of the interior of the lens 1000', and n2 being the effective dielectric constant of the sidewall 1110' of the lens 1000', which is greatly influenced by the sidewall plurality of structural disruptions 1400' such that the phase of the EM radiation is delayed or advanced, by design. The same effect is also achieved at the boresight direction, i.e., Z=0 direction, by employing the structural disruption (e.g., indented ring) 1250' in the outer upper surface of the aperture 1200'. By adjusting the effective dielectric constant of the sidewall and aperture as disclosed herein, the resulting E-field when present within the lens and radiates out of the lens can be bent to reduce SLL and improve gain.

As disclosed herein, the dielectric structure 1000' forms a lens and not a dielectric resonator antenna, wherein the sidewall 1110' of the lens 1000' having the plurality of structural disruptions 1400' is configured to bend an E-field, when present, that originates from within the lens 1000' and radiates out of the lens 1000', such that the E-field results in higher gain bore site radiation with reduced side lobe level radiation as compared to the structure absent the plurality of structural disruptions.

Figure 9:
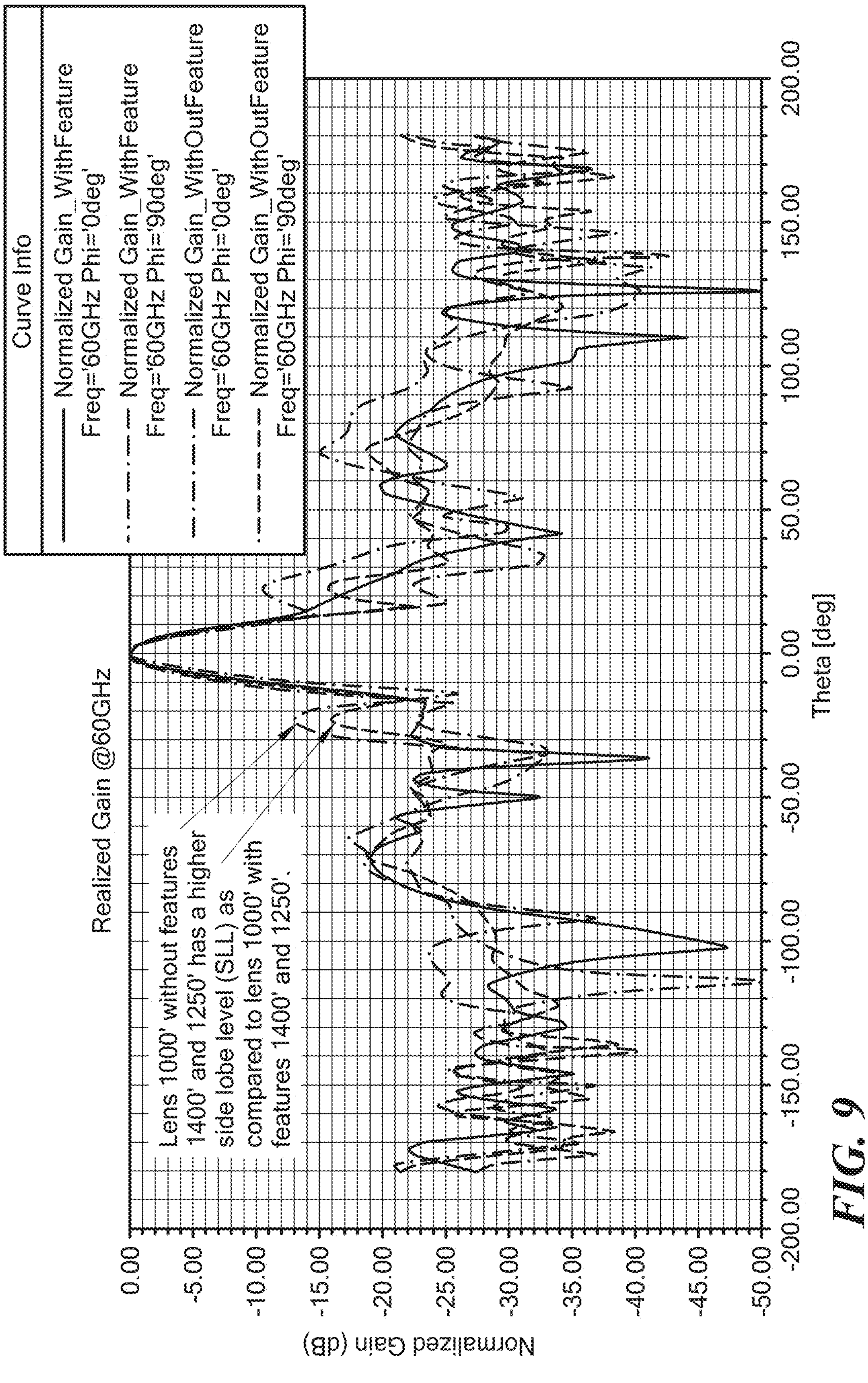
FIG. 9 depicts example comparative analytical performance characteristics of a low directivity output single radiating element with (FIG. 7A) and without (FIG. 7B) internal sidewall features and aperture features as disclosed herein, in accordance with an embodiment.

With reference to FIG. 9, example comparative analytical performance characteristics with and without structural disruptions 1400' on the sidewall 1110' and structural disruption 1250' on the aperture 1200' of an example lens 1000' as disclosed herein, are illustrated. As depicted FIG. 9 employing a single source of EM radiation 3200 having low directivity, and at a boresight of theta=0 degrees, a lens 1000' absent the above noted features 1400' and 1250' has a higher SLL as compared to the same lens 1000' having the features 1400' and 1250'. As can be seen, the normalized gain with the features 1400' and 1250' is about 23 dbi above the SLL in the range of +/−30-degs, while the normalized gain without the features 1400' and 1250' is only about 11 dbi above the SLL in the range of +/−30-degs. It will also be noticed by the gain distribution in the range from theta=−90 degrees to theta=+90 degrees that the presence of the features 1400' and 1250' also improves the directivity of the EM radiation output by reducing the SLL.

Figure 10A:
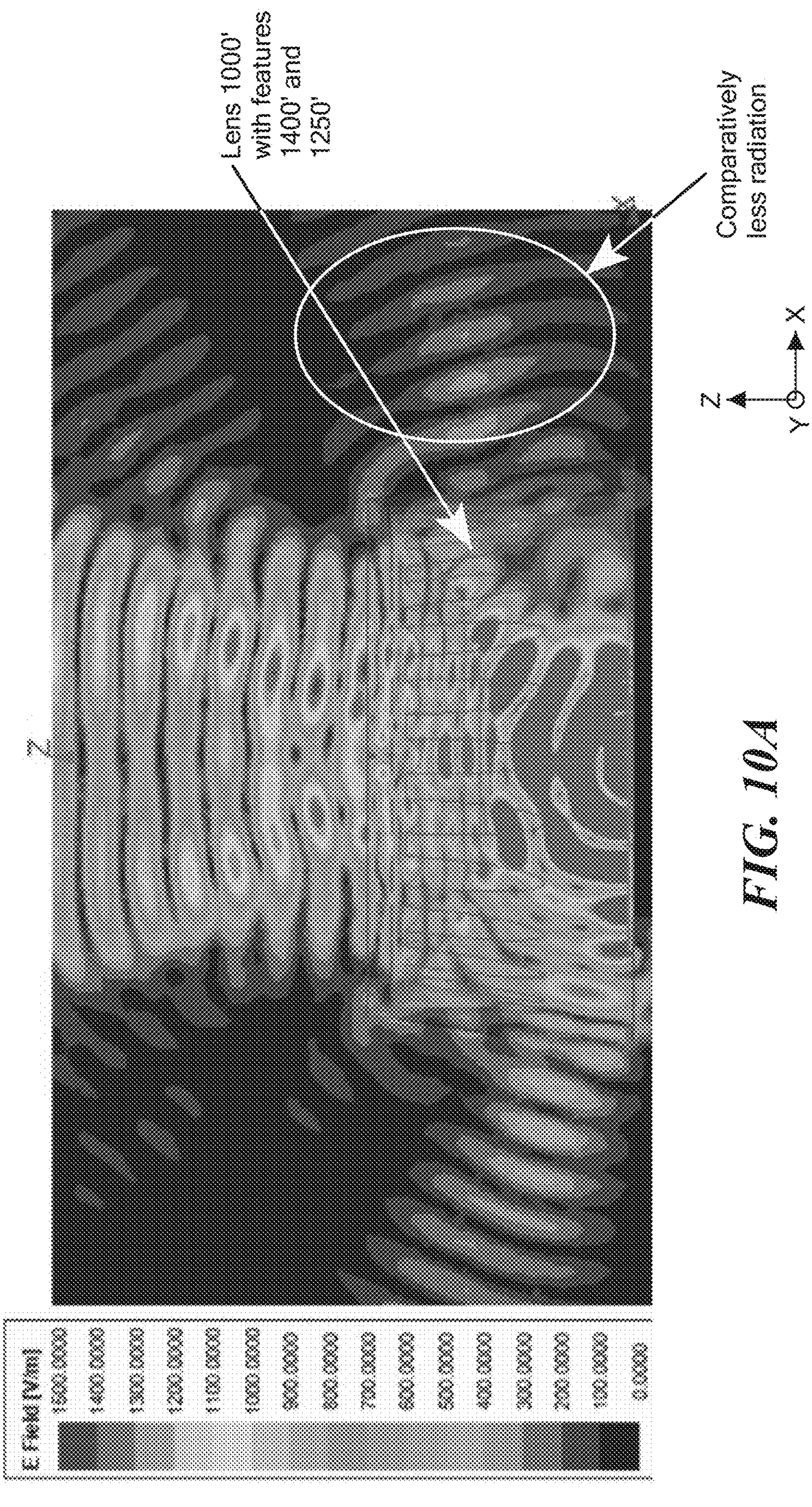
FIGS. 10A and 10B depict additional example comparative analytical performance characteristics of a low directivity output single radiating element with (FIG. 7A) and without (FIG. 7B) internal sidewall features and aperture features as disclosed herein, in accordance with an embodiment.
Figure 10B:
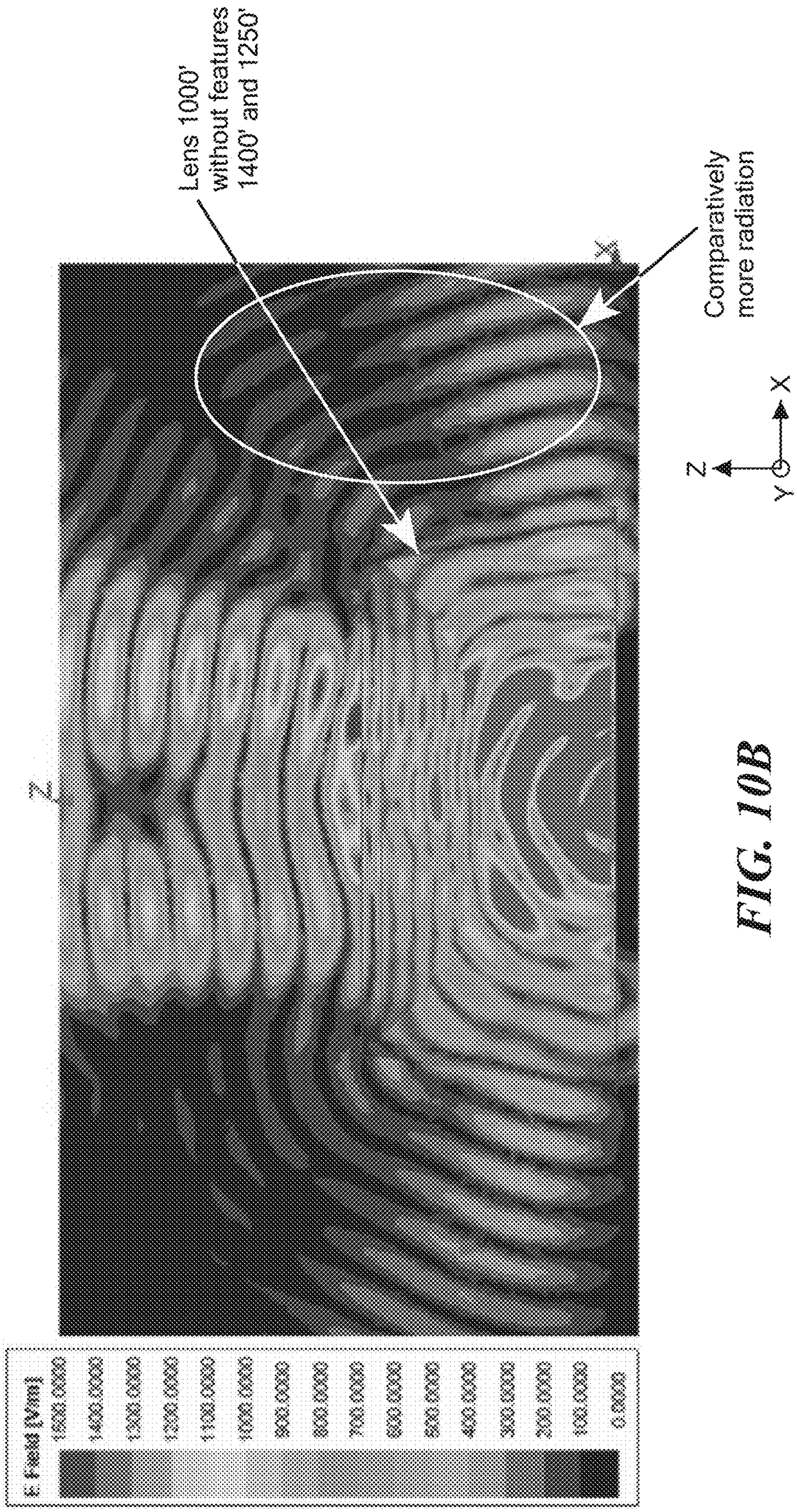

FIGS. 10A and 10B depict additional example comparative analytical performance characteristics, E-field intensity, of a low directivity output single radiating element 3200 with (FIG. 7A) and without (FIG. 7B) internal sidewall features 1400' and aperture features 1250', as disclosed herein.

From the foregoing, a dielectric structure for a lens has been disclosed herein that is composed of a single material that is either; a high Dk material, Dk on the order of 7-20 for example, with a low profile, or a low Dk material, Dk on the order of 2-6 for example, with a high profile, where both structures have the function of converting a low directivity EM spherical wavefront output from a radiating element to a high directivity EM planar wavefront output from the lens, while also reducing SLL, and where the lens is scalable for a frequency range of interest.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc., or any reference to orientation, do not denote a limitation of structure, as the structure may be viewed from more than one orientation, but rather denote a relative structural relationship between one or more of the associated features as disclosed herein. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

In view of all of the foregoing, it will be appreciated that various aspects of an embodiment are disclosed herein, which are in accordance with, but not limited to, at least the following aspects and/or combinations of aspects.

Aspect 1. A dielectric structure useful for shaping electromagnetic, EM, phase wavefronts, the structure comprising: a body having a monolithic construct; the body having a low profile, in that a height dimension, H, from a proximal end to a distal end is equal to or less than 60% of an overall outside dimension, D, of the body at the distal end, the distal end being disposed a distance away from the proximal end along a z-axis of an orthogonal x-y-z coordinate system, the distal end forming an electromagnetic aperture of the structure; the body having a sidewall between the proximal end and the distal end that forms and defines an interior cavity that is open at the proximal end, and closed at the distal end, the sidewall comprising a plurality of structural disruptions around an enclosing boundary of the interior cavity, the plurality of structural disruptions disposed and configured to reduce electromagnetic reflections.

Aspect 2. The structure of Aspect 1, wherein: the monolithic construct is composed of a single all-dielectric material.

Aspect 3. The structure of any one of Aspects 1 to 2, wherein: the aperture has a varying thickness that varies radially from a central z-axis of the aperture to an outer perimeter of the aperture.

Aspect 4. The structure of Aspect 3, wherein: the varying thickness of the aperture is symmetrical about the central z-axis, such that a 3D construct of the aperture is definable by rotating a 2D axial cross-sectional profile about the central z-axis.

Aspect 5. The structure of any one of Aspects 1 to 4, wherein: the body comprises interior and exterior surfaces that are structured to be moldable via a single-axis molding machine having positive and negative mold forms that are movable relative to each other along the z-axis.

Aspect 6. The structure of any one of Aspects 1 to 5, wherein: the body comprises interior and exterior surfaces that are structured with a draft angle that tapers radially outward, along the z-axis, from the distal end to the proximal end.

Aspect 7. The structure of any one of Aspects 1 to 6, wherein: the body has an x-z cross section that forms a curved profile at the distal end that is thicker in the center of the body than at the perimeter of the body.

Aspect 8. The structure of Aspect 7, wherein: the curved profile extends into the interior cavity of the body.

Aspect 9. The structure of any one of Aspects 1 to 7, wherein: the body has an y-z cross section that forms a curved profile at the distal end that is thicker in the center of the body than at the perimeter of the body.

Aspect 10. The structure of Aspect 9, wherein: the curved profile extends into the interior cavity of the body.

Aspect 11. The structure of any one of Aspects 1 to 9, wherein: the aperture has an effective dielectric, Dk, constant value that is greater at the center of the aperture than at the perimeter of the aperture.

Aspect 12. The structure of Aspect 11, wherein: the effective Dk constant is defined, at a given location within the aperture, as the average dielectric constant over a cubic volume of the aperture having a volume of $\lambda_o^3$, where $\lambda_o$ is the free space wavelength of electromagnetic radiation at a defined operating frequency of the structure.

Aspect 13. The structure of any one of Aspects 1 to 12, wherein: the sidewall has an effective dielectric, Dk, constant value that is less than an effective Dk constant at the center of the aperture.

Aspect 14. The structure of any one of Aspects 1 to 13, wherein: the sidewall has an effective dielectric, Dk, constant value that is greater than an effective Dk constant at the perimeter of the aperture, the sidewall being disposed radially outboard of the perimeter of the aperture.

Aspect 15. The structure of any one of Aspects 1 to 14, wherein: at least one of an exterior surface and an interior surface of the sidewall comprises an EM material attached thereto in a manner to reduce electromagnetic reflections and side lobe levels.

Aspect 16. The structure of Aspect 15, wherein: the EM material consists of a single layer of EM material.

Aspect 17. The structure of Aspect 15, wherein: the EM material comprises a plastic or a foam comprising. metallic particles, magnetic particles, or ceramic particles, which serve to provide a lossy EM material at a defined operating frequency of the structure.

Aspect 18. The structure of Aspect 15, wherein: both of the exterior surface and the interior surface comprise the EM material attached thereto.

Aspect 19, The structure of Aspect 18, wherein: the EM material is attached via; adhesive bonding, thermal bonding, press-fit mechanical bonding, or two-shot injection molding.

Aspect 20. The structure of Aspect 19, wherein: the EM material conforms to the shape of the at least one exterior surface and interior surface of the sidewall.

Aspect 21. The structure of any one of Aspects 1 to 20, wherein: the body further comprises a monolithically formed support feature that extends radially outboard of the aperture at the proximal end, the support feature configured to permit attachment of the structure to a substrate.

Aspect 22. The structure of Aspect 21, wherein: the substrate comprises a printed circuit board.

Aspect 23. The structure of Aspect 22, wherein: the printed circuit board comprises a source of EM radiation disposed and configured to direct the EM radiation toward the aperture.

Aspect 24. The structure of Aspect 21, wherein: the substrate comprises a housing of a system.

Aspect 25. The structure of Aspect 21, wherein: the substrate comprises a waveguide.

Aspect 26. The structure of any one of Aspects 21 to 25, wherein the support feature is configured and disposed to position the body off of the substrate to form a gap therebetween.

Aspect 27. The structure of Aspect 24, wherein: the housing comprises support and attachment features configured and disposed to support and attach to the support feature of the body.

Aspect 28. The structure of any one of Aspects 26 to 27, wherein: the system comprises the housing and further comprises a printed circuit board comprising a source of electromagnetic radiation configured to be directed toward the aperture.

Aspect 29. The structure of Aspect 28, wherein: the system further comprises a heat sink disposed in thermal conductivity with and between the printed circuit board and the housing.

Aspect 30. The structure of Aspect 29, wherein: the heat sink and the printed circuit board are disposed within the gap between the substrate and the body.

Aspect 31. The structure of any one of Aspects 26 to 30, wherein: the body, the substrate, or both the body and the substrate, includes a standoff configured and disposed to form the gap between the substrate and the body.

Aspect 32. The structure of any one of Aspects 1 to 31, wherein: the all-dielectric material has a dielectric constant equal to or greater than 2 and equal to or less than 20, alternatively equal to or greater than 4 and equal to or less than 20, further alternatively equal to or greater than 6 and equal to or less than 20, yet further alternatively equal to or greater than 10 and equal to or less than 20.

Aspect 33. The structure of any one of Aspects 1 to 32, wherein: the plurality of structural disruptions in the sidewall are uniformly distributed around the enclosing boundary of the interior cavity.

Aspect 34. The structure of any one of Aspects 1 to 33, wherein: an outer surface of the aperture comprises one or more of a structural disruptions formed around a central z-axis of the body.

Aspect 35. The structure of Aspect 34, wherein: the one or more of a structural disruption is an indented ring formed in the outer surface of the aperture.

Aspect 36. The structure of any one of Aspects 1 to 35, wherein: the aperture has a circular outer perimeter as observed in a top-down plan view of the structure.

Aspect 37. The structure of any one of Aspects 1 to 36, wherein: the body is operational at a frequency having a wavelength in the millimeter-wave or microwave electromagnetic spectrum.

Aspect 38. The structure of any one of Aspects 1 to 37, wherein: the body is operational at a frequency that is equal to or greater than 57 GHz and equal to or less than 64 GHz.

Aspect 39. The structure of any one of Aspects 1 to 38, wherein: the body is operational to convert a spherical phase electromagnetic wavefront to a planar phase electromagnetic wavefront.

Aspect 40. The structure of any one of Aspects 1 to 39, wherein: the all-dielectric material comprises: a plastic; and, a filler material having a dielectric constant greater than the dielectric constant of the plastic.

Aspect 41. The structure of Aspect 40, wherein the filler material comprises a ceramic.

Aspect 42. The structure of Aspect 40, wherein the plastic comprises a thermoplastic.

Aspect 43. The structure of Aspect 40, wherein the plastic comprises a thermoset plastic.

Aspect 44. The structure of any one of Aspects 1 to 43, wherein: the plurality of structural disruptions in the sidewall are separated from one another in that adjacent ones of the plurality of structural disruptions do not overlap or intersect each other.

Aspect 45. The structure of any one of Aspects 1 to 44, wherein: each one of the plurality of structural disruptions in the sidewall is an indentation in the sidewall, and has a width W that curvingly transitions from a width W1 at the distal end of the body to a tangent of a radius R2 at the proximal end of the body.

Aspect 46. The structure of any one of Aspects 1 to 45, wherein: the all-dielectric material has a dielectric constant equal to or greater than 6 and equal to or less than 9.

Aspect 47. The structure of any one of Aspects 1 to 46, wherein: H is equal to or less than 40% of D.

Aspect 48. The structure of any one of Aspects 1 to 43, wherein: the plurality of structural disruptions in the sidewall blend with one another in that adjacent ones of the plurality of structural disruptions overlap or intersect each other.

Aspect 49. The structure of any one of Aspects 1 to 48, wherein: each one of the plurality of structural disruptions in the sidewall is an indentation in the sidewall, and has a first width W1 at the distal end of the body, and a second width W2 at the proximal end of the body; and, W2 is greater than W1.

Aspect 50. The structure of any one of Aspects 1 to 49, wherein: the all-dielectric material has a dielectric constant equal to or greater than 2 and equal to or less than 5.

Aspect 51. The structure of any one of Aspects 1 to 50, wherein: H is equal to or less than 50% of D.

Aspect 52. The structure of any one of Aspects 1 to 51, wherein: the structure forms a lens and not a dielectric resonator antenna, wherein the sidewall of the lens having the plurality of structural disruptions is configured to bend an E-field, when present, that originates from within the lens and radiates out of the lens, such that the E-field results in higher gain bore site radiation with reduced side lobe level radiation as compared to the structure absent the plurality of structural disruptions.

The invention claimed is:

1. A dielectric structure useful for shaping electromagnetic, EM, phase wavefronts, the structure comprising:

a body having a monolithic construct;

the body having a low profile, in that a height dimension, H, from a proximal end to a distal end is equal to or less than 60% of an overall outside dimension, D, of the body at the distal end, the distal end being disposed a distance away from the proximal end along a z-axis of an orthogonal x-y-z coordinate system, the distal end forming an electromagnetic aperture of the structure, the aperture having an effective dielectric, Dk, constant value that is greater at a center of the aperture than at a perimeter of the aperture;

the body having a sidewall between the proximal end and the distal end that forms and defines an interior cavity that is open at the proximal end, and closed at the distal end, the sidewall comprising a plurality of structural disruptions around an enclosing boundary of the interior cavity, the plurality of structural disruptions disposed and configured to reduce electromagnetic reflections.

2. The structure of claim 1, wherein:

the body has an x-z cross section that forms a curved profile at the distal end that is thicker in a center of the body than at a perimeter of the body.

3. The structure of claim 1, wherein:

the body has an y-z cross section that forms a curved profile at the distal end that is thicker in the center of the body than at the perimeter of the body.

4. The structure of claim 1, wherein:

the effective Dk constant is defined, at a given location within the aperture, as the average dielectric constant over a cubic volume of the aperture having a volume of $\lambda_o^3$, where $\lambda_o$ is the free space wavelength of electromagnetic radiation at a defined operating frequency of the structure.

5. The structure of claim 1, wherein:
the sidewall has an effective dielectric, Dk, constant value that is less than an effective Dk constant at the center of the aperture;
the sidewall has an effective dielectric, Dk, constant value that is greater than an effective Dk constant at the perimeter of the aperture, the sidewall being disposed radially outboard of the perimeter of the aperture.
6. The structure of claim 1, wherein:
at least one of an exterior surface and an interior surface of the sidewall comprises an EM material attached thereto in a manner to reduce electromagnetic reflections and side lobe levels.
7. The structure of claim 1, wherein:
the body further comprises a monolithically formed support feature that extends radially outboard of the aperture at the proximal end, the support feature configured to permit attachment of the structure to a substrate.
8. The structure of claim 7, wherein:
the substrate comprises a printed circuit board;
the printed circuit board comprises a source of EM radiation disposed and configured to direct the EM radiation toward the aperture.
9. The structure of claim 7, wherein:
the substrate comprises a housing of a system.
10. The structure of claim 9, wherein:
the housing comprises support and attachment features configured and disposed to support and attach to the support feature of the body.
11. The structure of claim 9, wherein:
the system comprises the housing and further comprises a printed circuit board comprising a source of electromagnetic radiation configured to be directed toward the aperture.
12. The structure of claim 11, wherein:
the system further comprises a heat sink disposed in thermal conductivity with and between the printed circuit board and the housing.
13. The structure of claim 12, wherein:
the heat sink and the printed circuit board are disposed within the gap between the substrate and the body.
14. The structure of claim 7, wherein:
the substrate comprises a waveguide.
15. The structure of claim 7, wherein
the support feature is configured and disposed to position the body off of the substrate to form a gap therebetween.
16. The structure of claim 15, wherein:
the body, the substrate, or both the body and the substrate, includes a standoff configured and disposed to form the gap between the substrate and the body.
17. The structure of claim 1, wherein:
the body is formed from of an all-dielectric material that has a dielectric constant equal to or greater than 2 and equal to or less than 20.
18. The structure of claim 1, wherein:
the plurality of structural disruptions in the sidewall are uniformly distributed around the enclosing boundary of the interior cavity.
19. The structure of claim 1, wherein:
an outer surface of the aperture comprises one or more of a structural disruption formed around a central z-axis of the body.
20. The structure of claim 19, wherein:
the one or more of a structural disruption is an indented ring formed in the outer surface of the aperture.
21. The structure of claim 1, wherein:
the aperture has a circular outer perimeter as observed in a top-down plan view of the structure.
22. The structure of claim 1, wherein:
the body is operational to convert a spherical phase electromagnetic wavefront to a planar phase electromagnetic wavefront.
23. The structure of claim 1, wherein:
the plurality of structural disruptions in the sidewall are separated from one another in that adjacent ones of the plurality of structural disruptions do not overlap or intersect each other.
24. The structure of claim 1, wherein:
each one of the plurality of structural disruptions in the sidewall is an indentation in the sidewall, and has a width W that curvingly transitions from a width W1 at the distal end of the body to a tangent of a radius R2 at the proximal end of the body.
25. The structure of claim 1, wherein:
H is equal to or less than 40% of D.
26. The structure of claim 1, wherein:
the plurality of structural disruptions in the sidewall blend with one another in that adjacent ones of the plurality of structural disruptions overlap or intersect each other.
27. The structure of claim 1, wherein:
each one of the plurality of structural disruptions in the sidewall is an indentation in the sidewall, and has a first width W1 at the distal end of the body, and a second width W2 at the proximal end of the body; and
W2 is greater than W1.
28. The structure of claim 1, wherein:
the body is formed from of an all-dielectric material that has a dielectric constant equal to or greater than 2 and equal to or less than 5.
29. The structure of claim 1, wherein:
H is equal to or less than 50% of D.
30. The structure of claim 1, wherein:
the structure forms a lens and not a dielectric resonator antenna, wherein the sidewall of the lens having the plurality of structural disruptions is configured to bend an E-field, when present, that originates from within the lens and radiates out of the lens, such that the E-field results in higher gain bore site radiation with reduced side lobe level radiation as compared to the structure absent the plurality of structural disruptions.

* * * * *